United States Patent [19]
Adler et al.

[11] Patent Number: 4,623,372
[45] Date of Patent: Nov. 18, 1986

[54] CRYSTALLIZATION PROCESS

[75] Inventors: Robert J. Adler, Shaker Heights; William R. Brown, Brecksville; Lun Auyang, Highland Heights; Yin-Chang Liu, Richmond Heights; W. Jeffrey Cook, Cleveland Heights, all of Ohio

[73] Assignee: CNG Research Company, Cleveland, Ohio

[21] Appl. No.: 629,615

[22] Filed: Jul. 11, 1984

[51] Int. Cl.⁴ .............................................. B01D 9/00
[52] U.S. Cl. ....................... 62/532; 62/535; 62/537; 62/539; 62/540; 62/542; 23/295 R; 422/251
[58] Field of Search ................ 62/12, 532, 533, 534, 62/535, 537, 538, 539, 540, 541, 542, 544, 545; 23/295 R, 296; 203/48; 422/251

[56] References Cited

U.S. PATENT DOCUMENTS

| | | | |
|---|---|---|---|
| 3,501,924 | 3/1970 | Ashley | 62/537 |
| 3,592,016 | 7/1971 | Bligh | 62/533 |
| 4,270,937 | 6/1981 | Adler et al. | 62/12 |
| 4,380,532 | 4/1983 | Mazurin et al. | 23/295 R |
| 4,400,189 | 8/1983 | Arkenbout et al. | 62/538 |
| 4,453,959 | 6/1984 | Bishkin | 62/535 |
| 4,491,462 | 1/1985 | Thijssen et al. | 62/542 |

OTHER PUBLICATIONS

Chemical Engineering, May 7, 1979, pp. 72–82, James A. Heist.
Rudd, Powers & Sirola, "Process Synthesis", pp. 259–280 (1973).
Scientific American, Dec. 1962, pp. 41–47.

*Primary Examiner*—S. Leon Bashore
*Assistant Examiner*—Andrew J. Anderson
*Attorney, Agent, or Firm*—Pearne, Gordon, Sessions, McCoy, Granger & Tilberry

[57] ABSTRACT

An improved crystallization process is disclosed for separating a crystallizable material and an excluded material which is at least partially excluded from the solid phase of the crystallizable material obtained upon freezing a liquid phase of the materials. The solid phase is more dense than the liquid phase, and it is separated therefrom by relative movement with the formation of a packed bed of solid phase. The packed bed is continuously formed adjacent its lower end and passed from the liquid phase into a countercurrent flow of backwash liquid. The packed bed extends through the level of the backwash liquid to provide a drained bed of solid phase adjacent its upper end which is melted by a condensing vapor.

50 Claims, 4 Drawing Figures

CRYSTALLIZATION PROCESS

BACKGROUND OF THE INVENTION

This invention relates to an improved crystallization process for separation of a material that is crystallizable by freezing from other material. The process is performed at or near the triple point conditions of the materials. The process is characterized by a solid phase crystallizable material having a greater density than that of the liquid phase from which it is frozen, the solid phase tending to settle in the liquid phase by gravity. The solid phase is separated from the liquid phase to provide a drained bed in which the solid phase is melted.

The crystallization process is particularly useful in connection with the acid gas separation process disclosed in assignee's U.S. Pat. No. 4,270,937, dated June 2, 1981, the teachings of such patent being incorporated herein by reference. The patent discloses a comprehensive gas separation process which includes the use of a liquid carbon dioxide absorbent to separate certain acid gases and other impurities from a gas stream also containing lower boiling point components. There is also disclosed a triple point crystallization process for separating the carbon dioxide absorbent and absorbed impurities. In such crystallization process, the solid phase is formed and melted at spaced locations in the liquid phase. The solid phase is formed in a crystal forming zone in an upper region of the liquid phase and settles by gravity to a crystal melting zone in a lower region of the liquid phase. The solid phase is washed as it settles through the liquid phase intermediate the two zones. A condensing vapor is introduced into the melt zone for melting the submerged solid phase. The operating pressure in the melt zone is maintained above the triple point pressure by the static head of the liquid phase.

The prior melting technique within the liquid phase has not been entirely satisfactory, due to the inability to achieve sufficiently high melt rates in an energy-efficient manner. The major rate-limiting step in such prior technique is believed to be the resistance to latent heat transfer from condensing vapor to melting solid through the continuous liquid phase surrounding the solid crystals.

The location of the melt zone in a lower region of the liquid phase also tends to limit the transport of solid phase to gravity settling thereof through the liquid phase. This may comprise an undesirable process limitation in certain applications.

In a distinct separation task, the use of crystallization processes at triple point conditions for desalination of sea water is described in Rudd, Powers, & Sirola, *Process Synthesis*, pp. 259–280 (1973); *Chemical Engineering*, May 7, 1979, pp. 72–82; and *Scientific American*, December 1962, pp. 41–47. These prior art processes include direct contact heat exchange systems with and without the use of a secondary refrigerant comprising an in situ heat transfer component. In a single stage system, the use of evaporative cooling to form a bed of solid phase and the melting of the solid phase by direct contact with a compressed evaporation vapor are also described.

It is believed that these prior art desalination processes were not found to be entirely satisfactory due in part to their inability to provide economically high production rates. Specifically, the production rates were limited by the low vapor pressure of water at its triple point, which limits the pressure driving force to about 4.6 mm mercury. Further, the production rates were also limited by the contamination of the evaporation vapor with salt due to its entrainment during the extremely agitated conditions of evaporation (or, more descriptively, boiling) at high production rates. Further, the melt rate is believed to be a limiting factor due to the tendency of the melting to occur at the bed exterior surface only.

SUMMARY OF THE INVENTION

In accordance with the present invention, improved production rates are obtained by melting the solid phase in a drained bed after it has been separated from the liquid phase. The melt liquid drains freely through the bed without accumulation therein. Thus, the drained bed is substantially free of liquid during the melting step, and significantly improved melt rates are obtained as compared with the prior art melt techniques.

In a preferred embodiment, the drained bed of the solid phase is contacted by a condensing vapor of an in situ heat transfer component during the melting step. The condensing vapor penetrates the drained bed and contacts the interior surface of the bed to provide increased vapor-solid contact area and melting.

The melt step improvements herein described are believed to result from both the elimination of the liquid phase resistance to heat transfer and the penetration of the drained bed by the condensing vapor to increase the vapor-solid contact area. These combined improvements are not possible in the submerged solid phase melt techniques, due to the surrounding liquid phase, nor in the desalination processes, due to the relatively low triple point pressure of water. As compared with the melt rate obtained using submerged solid phase melt techniques, the melt rate is five times greater using the subject process in a system of like composition. The improvement in melt rate is directly proportional to the depth of the vapor penetration with allowance for the downwardly increasing flow of melt liquid. Thus, a penetration depth of two inches approximately doubles the melt rate obtained at a penetration depth of one inch.

The solid phase and liquid phase from which the solid was frozen are transported as a slurry and the solid phase is moved in an upward direction with respect to the liquid phase of the slurry as it is separated therefrom to form a packed bed of the solid phase which provides the drained bed at its upper end. The liquid phase of the slurry may be used as a carrier and support fluid to buoy the solid phase in an upward direction by means of the frictional forces between the moving liquid phase and the solid phase. Preferably, a mechanical lift member is arranged to provide upward movement of the solid phase and the liquid phase of the slurry may be used to deliver the solid phase to the mechanical lift.

In the illustrated embodiments, the packed bed is continuously formed adjacent its lower end in the liquid phase of the slurry, moved upwardly through a liquid interface and directly into a countercurrent flow of backwash liquid, and melted in the drained bed formed adjacent its upper end which projects beyond the level of the backwash liquid. The packed bed movement positions the drained bed in a melt zone formed in a vapor space above the liquid level. This facilitates the handling of the solid phase, since it is continuously and sequentially submerged in the liquid phase and then the backwash liquid at all times until the drained bed is formed.

The height of the drained bed tends to be self-regulating, since the vapor-solid contact area and melt rate increase as the bed height increases. Accordingly, corrective changes in the melt rate will occur if a constant pressure is maintained in the melt zone.

The solid phase separation and drained bed formation of this process are independent of gravity settling rates which tend to restrict certain prior process applications. This also allows the melt step improvements to be utilzed more fully.

DETAILED DESCRIPTION OF THE DRAWINGS

Although the crystallization process of the present invention is described hereinafter with reference to the separation of acid gases and other contaminants, it is applicable to systems of mixtures of materials displaying triple point locus conditions as discussed more fully below, and containing a crystallizable material, one or more other materials or impurities which are at least partially excluded from a solid phase containing the crystallizable material obtained from freezing a liquid phase of the system. The process is performed at triple point temperature and pressure conditions such that the gas, liquid, and solid phase of the system coexist nearly in equilibrium.

In preferred embodiments of the invention, the cooling to form the solid phase is provided by evaporation of an in situ heat transfer component, and the heating to melt the solid phase is provided by the condensation or absorption of a vapor phase of the in situ heat transfer component which directly contacts the solid phase.

The crystallization process may be performed in various cascade process arrangements including a multiple-stage separation process wherein the solid phase is formed and melted in a plurality of series-connected vessels. In such cascade arrangements, the vapor phase of the in situ heat transfer component for melting the solid phase in a first stage is provided by compressing the evaporation vapor of the in situ heat transfer component from the second stage. Mass flow between stages or vessels is provided by liquid, vapor, and slurry streams. Thus, a crystallizable material-enriched output obtained upon melting the solid phase in the first stage is passed to the second stage for recrystallization and further purification as a liquid stream. An excluded material-enriched output of the second stage is passed to the first stage for further concentration as a liquid reflux stream or as a component of the evaporation vapor of the in situ heat transfer component of the second stage, or both.

The evaporation of the in situ heat transfer component includes boiling thereof, which may extend a considerable distance into the liquid mixture. Thus, the term "evaporation" is intended to include boiling or pool boiling herein. As will become more apparent hereinafter, the in situ heat transfer component may comprise a material specifically added to the separation system which undergoes absorption into a liquid phase enriched in the crystallizable material during the melting of the solid or crystal phase to release its heat of absorption. The heat of condensation and the heat of absorption of a given material are substantially the same, and therefore the terms "absorption" and "condensation" can be used interchangeably. For convenience in the further description herein and in the claims, reference to a condensing gas or vapor or vapor phase for purposes of melting the solid or crystal phase in the crystallization process is deemed to also include a gas or vapor or vapor phase undergoing absorption.

Figure 1:
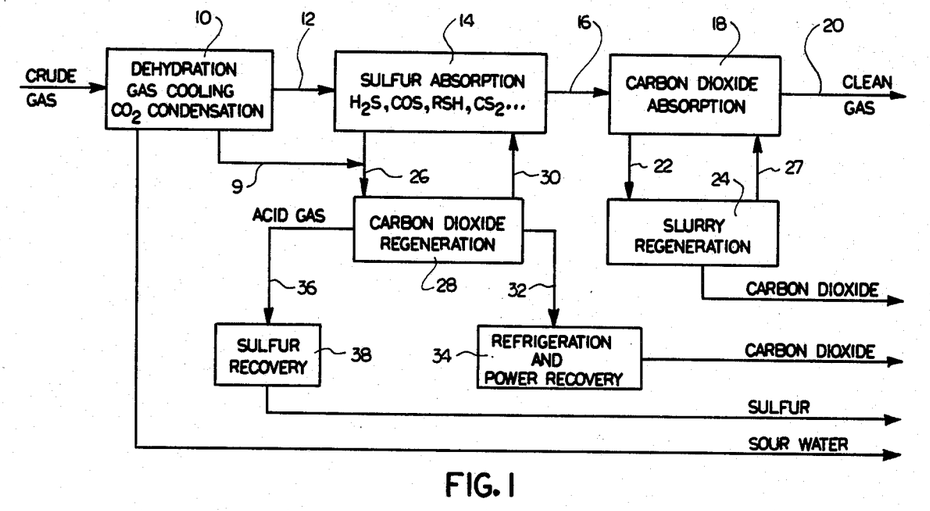
FIG. 1 is a block diagram of a more comprehensive gas separation process in which the crystallizer of the present invention may be incorporated.

Referring to FIG. 1, a comprehensive gas separation process is shown in block diagram form. As indicated above, this more comprehensive process is described in detail in U.S. Pat. No. 4,270,937. Herein, the process is briefly described to demonstrate the incorporation therein of the crystallizer of the present invention.

In accordance with the process, acid gases such as carbon dioxide, hydrogen sulfide, and sulfur dioxide, other sulfur-containing molecules such as carbonyl sulfide, and other relatively high boiling point impurities are separated from lower boiling point components of a gas stream. The crude gas stream or raw shift gas mixture is dehydrated and precooled to its dew point temperature in a heat exchange system 10. The dehydrated stream is then further cooled to about −55° C., causing a portion of carbon dioxide in the crude gas to condense. The condensate stream is contaminated with cocondensed impurities and withdrawn through line 9. The dehydrated crude gas, now partially denuded of carbon dioxide, flows via line 12 to a sulfur absorption system 14 for removal of relatively high boiling point components, particularly hydrogen sulfide and other sulfur-containing molecules. The residual, partially purified stream then flows via line 16 to a carbon dioxide absorption system 18, wherein the temperature of the gas stream is lowered to well below the triple point temperature of carbon dioxide. A purified gas stream emerges through line 20. The absorbent in the system 18 is in the form of a liquid-solid slurry, preferably comprising an organic liquid vehicle and carbon dioxide in the solid phase. The spent slurry is passed from the system 18 via line 22 to a slurry regeneration system 24 and returned via line 27. A carbon dioxide output stream is also obtained.

A liquid carbon dioxide absorbent is used in absorption system 14. The spent absorbent, including the absorbed impurities, is combined with the condensate in line 9 and passed via line 26 to a carbon dioxide regeneration system 28, which incorporates the crystallizer of the present invention, as discussed below in greater detail. The purified carbon dioxide absorbent is returned to the absorption system 14 through line 30, and a portion of the carbon dioxide product is passed through line 32 to a refrigeration and power recovery system 34. A pure carbon dioxide output stream is obtained. The system 23 also results in an output comprising the concentrated impurities which is passed via line 36 to a sulfur recovery system 38.

Figure 2:
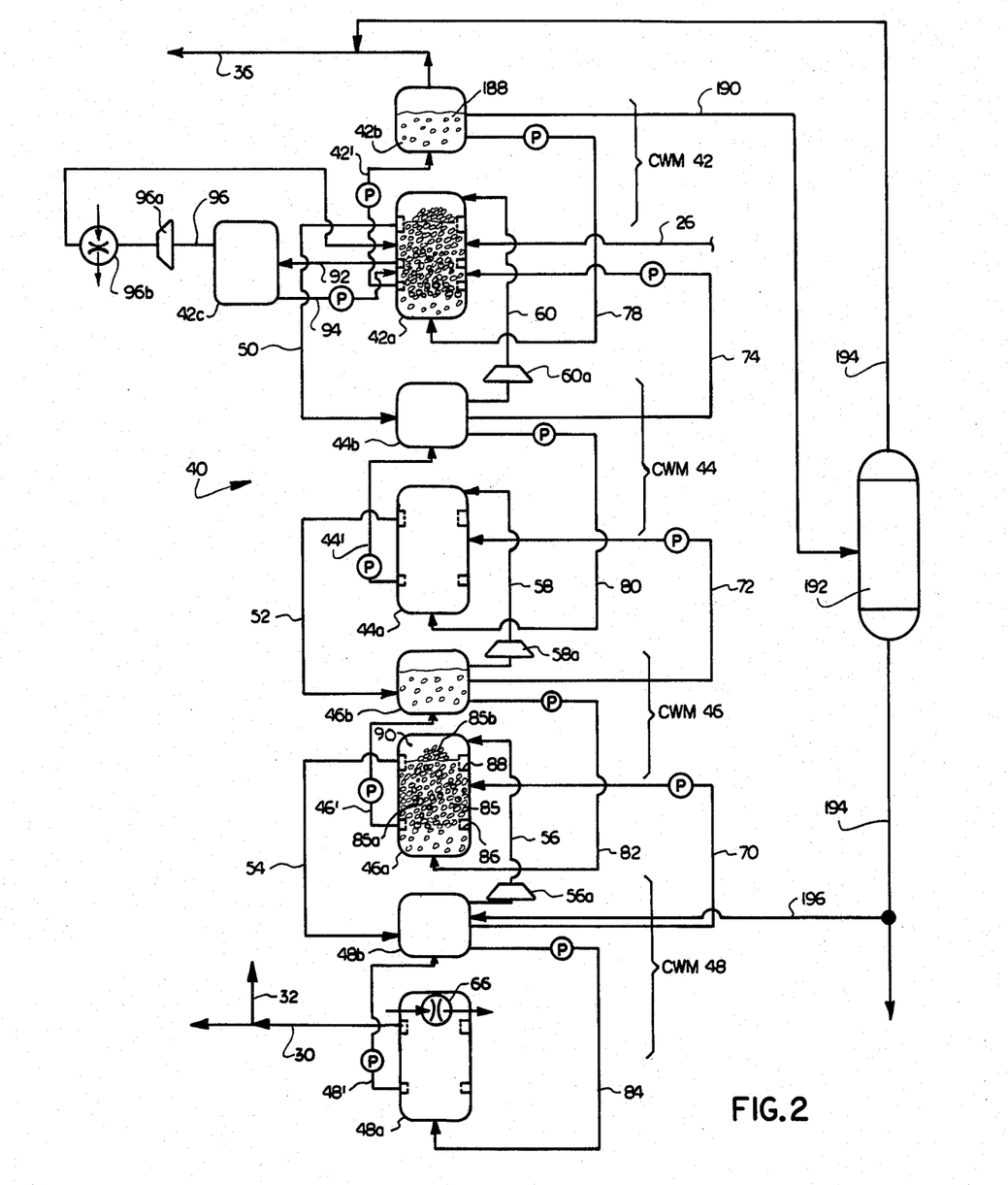
FIG. 2 is a general flow diagram showing the triple point crystallization separation process.

Referring to FIG. 2, a series-staged crystallizer 40 is shown which may be incorporated in the carbon dioxide regeneration system 28. To that end, it may be assumed that the stream flowing in line 26 from the systems 10 and 14 consists essentially of liquid carbon dioxide and sulfur-containing molecules in a total concentration therein up to about 4 mol percent. This stream is the feed to the crystallizer and it is processed to provide a hydrogen sulfide overhead product through line 36 useful as a feed to a Claus plant and to supply a substantially pure liquid carbon dioxide bottom product through line 30 for further use in the main gas separation process as an absorbent.

The crystallizer includes four series-connected crystallizer-washer-melter units ("CWM's") 42, 44, 46, and 48. Each CWM may comprise a cooperating pair of vessels as shown or a single vessel with an appropriate barrier therein.

The feed is introduced into CWM 42 to provide an upper rectification section for enriching or concentrating the hydrogen sulfide and other sulfur-containing molecules. As shown, it is generally necessary to provide only one stage in the rectification section, since the separation factor upon crystallization is typically so large (in the order of 100 or more) that the crystallizable material-enriched product from a single stage is already substantially purer than the feed. The CWM's 44, 46, and 48 are located below the feed line 26 and provide a stripping section to remove hydrogen sulfide and other sulfur-containing molecules from carbon dioxide.

The number and type of stages shown in FIG. 2 are appropriate for treating the liquid carbon dioxide absorbent and absorbed sulfur-containing molecules (4 mol percent) from the main gas separation process to provide an overhead discharge via line 36 containing hydrogen sulfide in a total concentration of about 25 mol percent or more and a substantially pure carbon dioxide bottom product discharged via line 30 and containing less than 1 ppm hydrogen sulfide and other sulfur-containing molecules. Herein, a four-stage process has been illustrated, but the desired separation may be achieved with fewer than four stages.

Throughout the cascade of the crystallizer 40, crystalline carbon dioxide (the crystallizable material) is formed and moved in a downward direction and hydrogen sulfide and other sulfur-containing molecules (the excluded material) excluded from the crystalline carbon dioxide is moved in an upward direction. In this system, the in situ heat transfer component is primarily carbon dioxide with a lesser content of the excluded material. There is an upwardly progressing depression of the triple points of the mixtures in the system, due to the increasing concentration of excluded material. Accordingly, upwardly decreasing temperature and pressure operating conditions are established in the cascade.

The operating pressures may include as high as a 30 psia driving force based upon the triple point conditions of the materials to be separated. Thus, the final melting step may be performed at a pressure between the prevailing triple point pressure, i.e., the triple point pressure of the material at the desired purity and such pressure plus 30 psia. Similarly, the operating pressure in the flasher containing the liquid having the maximum concentration of excluded material which will have to be evaporated in order to obtain the desired excluded product may be in the range between the prevailing triple point pressure of the liquid phase and the higher of such pressure minus 30 psia or 0 psia. The operating temperatures are the corresponding temperatures at equilibrium conditions for the respective pressures. In accordance with efficiency considerations, the pressure driving force is preferably less than 5 psia and, in the illustrated process, the driving force pressure in the crystallization step may be in the range of 1 to 2 psia and in the melting step in the range of 2 to 3 psia.

The CWM 42 includes a washer-melter ("WM") vessel 42a and two associated flasher vessels 42b and 42c. Each of the remaining CWM's 44, 46, and 48, respectively, includes a WM and a single associated flasher vessel. In CWM's 42, 44, 46, and 48, the excluded material-enriched output of each WM is passed to its associated flasher via line 42', 44', 46', or 48', respectively.

Throughout the cascade of the crystallizer, liquid streams of progressively purer carbon dioxide are passed downwardly through lines 50, 52, and 54. These streams are withdrawn from each of the WM's at the locations of the highest concentrations of crystallizable material therein.

Vapor streams of progressively increasing concentration of the excluded material are passed upwardly between the CWM's via lines 56, 58, and 60. Each of the vapor streams is compressed to deliver it as a condensing vapor at the required pressure in the adjacent upper vessel through the use of compressors 56a, 58a, and 60a. In the lowermost CWM 48, a heat exchanger 66 is positioned within the WM 48a for melting the solid phase by indirect heat exchange therewith. As described below, the heat input to the exchanger 66 is derived from an upper stage of the crystallizer 40. Alternatively, a direct heat exchange system may also be used in this lowermost stage as described below in connection with other embodiments.

In the stripping section, excluded material is also moved in an upward direction by liquid reflux streams of progressively increasing concentration of excluded material within lines 70, 72, and 74. In each instance, a liquid reflux stream is drawn from a point of highest concentration of the excluded material in the lower stage and passed to the next higher WM to augment the liquid inventory therein. For clarity of illustration, the reflux lines 70, 72, and 74 are shown connected to the flashers instead of the excluded material supply lines 48', 46', and 44'.

The liquid in the flasher vessel 42b is evaporated to provide the excluded material-enriched overhead product which is discharged through line 36. This produces a solid phase enriched in carbon dioxide, which is returned as a slurry to the bottom of the WM 42a by means of line 78 with the aid of a pump. Additional slurry is produced in flasher 42c and returned to WM 42a to provide a sufficient total slurry flow to effect the desired purification in the stripping section as discussed below in further detail. Slurry produced in each of the flashers in the stripping section is withdrawn and delivered to the bottom of the WM associated with the flasher. Accordingly, appropriate slurry flows are provided in CWM's 44, 46, and 48 through lines 80, 82, and 84, respectively.

The mass flows introduced into the various units of the cascade are preferably introduced at points of matching composition, or as closely matched as possible, in accordance with conventional separation techniques. Generally, the composition of the liquid phase of the introduced material will be matched with the composition of the liquid phase of the material in the unit at the point of introduction.

The solid phase delivered to each of the WM's 42a, 44a, and 46a is washed and melted. The same processing techniques are used in each of these WM's. Accordingly, only the processing in WM 46a is described below in detail, it being understood that like processing is used in WM's 42a and 44a.

As diagrammatically shown in FIG. 2, an inventory of liquid is maintained in the WM 46a and slurry introduced into the bottom of the WM 46a moves in an upward direction with the formation of a packed bed 85 of solid phase including a lower submerged bed portion 85a. A screen collar 86 is provided for the withdrawal of the excluded material-enriched liquid via line 46'. The solid phase of the slurry is buoyed upwardly by the liquid phase movement in the lower region of the WM 46a and the packed bed tends to form adjacent the level of the screen collar 86.

The inventory of liquid within the WM 46a is maintained at a predetermined level adjacent a second screen collar 88. The collar 88 is used to withdraw the crystallizable material-enriched output via line 54.

The packed bed projects from the level of the inventory of liquid to provide drained bed portion 85b of solid phase within a melt or vapor zone 90 adjacent the top of the WM 46a. Vapor is continuously introduced into the melt zone 90 for direct heat transfer and melting of the solid phase within the drained bed. The melt zone 90 is maintained at a constant pressure several psi greater than the prevailing triple point pressure in accordance with the concentration of the materials present.

The drained bed is nearly devoid of liquid and the condensing vapor penetrates the bed for contact with the bed interior surface area provided by the solid phase. In the illustrated carbon dioxide system, penetration depths of up to six inches have been observed with one or two psia of pressure driving force. The melt liquid drains freely through the bed and a major portion of it is withdrawn via line 54 to provide a carbon dioxide-enriched output to the flasher 48b. The remaining portion of the melt liquid passes from the drained bed to provide backwash liquid to wash excluded material from the surface of the solid phase. Accordingly, the WM liquid inventory flows in a downward direction to the collar 86, and below the collar 86, the liquid flow is in an upward direction. The portion of the packed bed below the drained bed is submerged within this liquid inventory. The packed bed may extend below the level of the collar 86.

As described above, it is preferred to use a condensing vapor and direct heat transfer technique to melt the solid phase in the WM's 42a, 44a, and 46a. However, such processing is not required and, for example, indirect heat transfer may be used as in the WM 48a. Referring once again to WM 46a for purposes of convenience, indirect heat transfer is conveniently provided by passing the condensing vapor in line 56 into a heat exchanger (not shown) which is in contact with the solid phase. Following heat exchange, the condensed vapor is withdrawn from the heat exchanger for addition to the downward flow of progressively purer liquid carbon dioxide in line 54.

In the separation of carbon dioxide herein, the solid phase and the condensing vapor are both substantially carbon dioxide, and the mass flow ratio of condensing vapor to melting solid is about 1:1.7, based upon the values of the heat of vaporization (6600 BTU/lb. mole) and heat of fusion (3800 BTU/lb. mole) of carbon dioxide. Accordingly, the melt liquid is about one-third condensed vapor and two-thirds melted solid phase.

The formation of solid phase in the flasher 46b is in accordance with known triple point operations. The evaporation of the liquid phase and formation of the solid phase results from the withdrawal of vapor through line 58. (Once again, the one-third:two-thirds ratio applies.) The solid phase settles downwardly and it is withdrawn as a slurry through line 82 and introduced into the bottom of the WM 46a under flow conditions which allow the packed bed 85 to be continuously formed and moved upwardly.

In the crystallizer 40, the pumping of reflux and other liquid streams, as well as slurry streams, is required. In pumping a liquid stream or a stream including a liquid phase which is at its triple point temperature, the generation of heat by pump slippage must be minimized and any heat generated must otherwise be dissipated in order to prevent vaporization of the liquid and cavitation of the pump. For these purposes, it has been found practical to submerge the pump in a refrigerated liquid bath maintained at (or close to as possible) the triple point temperature of the stream being pumped without forming solids in the pump liquid. Further, a somewhat larger than normal net positive suction head is also helpful to minimize cavitation.

The operation and control of the crystallizer 40 to purify the condensate from heat exchanger system 10 and regenerate the spent absorbent from the sulfur absorption system 14 is now considered. As indicated above, a single rectification stage is sufficient and the overhead product may be passed via line 36 to a sulfur recovery system 38. However, multiple stripping stages are required to economically achieve the desired purity of less than 1 ppm of excluded material in the carbon dioxide product to be returned as an absorbent.

In accordance with the required purity, additional solid phase is provided in flasher 42c. To that end, a liquid flow is withdrawn from the WM 42a via line 92 and flashed within the flasher 42c to provide solid phase, which is returned as a slurry to the WM 42a through line 94. The evaporation vapor is withdrawn through line 96 and compressed in compressor 96a. The compressed vapor is then condensed in heat exchanger 96b and returned to the WM 42a at a point of matched concentration. Accordingly, the solid phase total corresponds with the vapor flows in lines 36 and 96, and such combined flow determines the required condensing vapor flow in line 60. The solid and vapor flows through each of the remaining CWM stages is ideally the same and the heat transfer in exchanger 66 is also determined.

The cooling required for condensing the vapor flowing in line 96 may be provided by the melting of the solid phase in WM 48a. To that end, a portion or all of the flow of compressed vapor in line 96 may be passed to the heat exchanger 66 to match the production flow through line 30. For example, a portion of the compressed vapor in line 96 may be passed to the heat exchanger 66 for indirect heat transfer and melting of the solid phase in the WM 48a. Thereafter, the condensed vapor may be withdrawn from the heat exchanger 66 and added to the liquid flow in line 96 downstream of the heat exchanger 96b. If all of the vapor flow in line 96 is passed to the heat exchanger 66, the heat exchanger 96b may be omitted.

The control of the crystallizer 40 includes control of the following process parameters: flasher liquid level, WM liquid level, WM solid phase level, and flow rate of the backwash liquid. The important features of the control are discussed below in detail with reference to FIG. 3, which schematically illustrates the control with respect to the CWM 46 of the crystallizer. Control line connections are indicated by dotted lines in FIG. 3.

Figure 3:
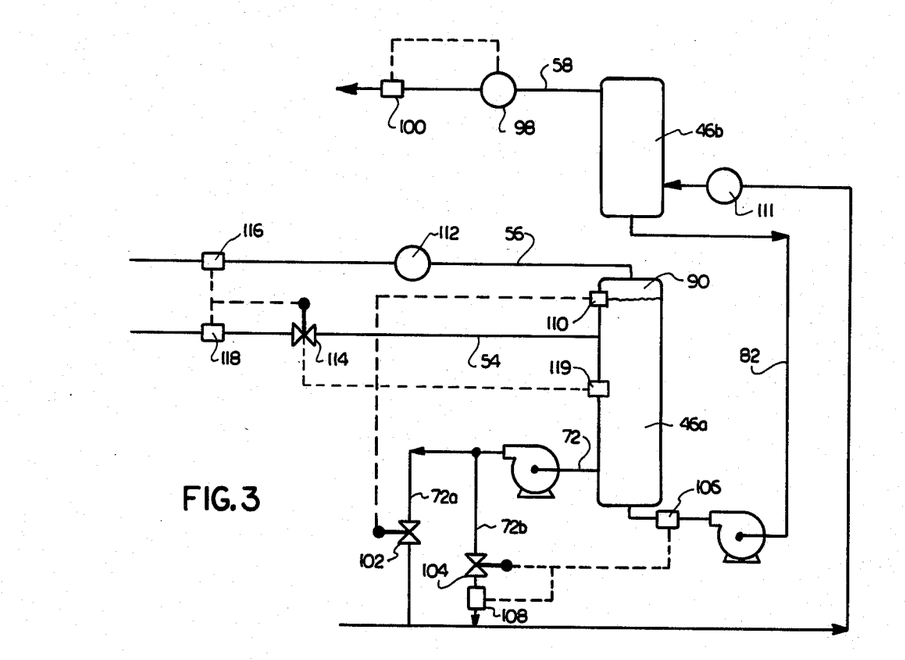
FIG. 3 is a portion of the general flow diagram of FIG. 2, with additional detail added to show the control of the process.

The formation of solid phase in the flasher 46b is controlled by regulation of the flow of evaporation vapor withdrawn through line 58. The flasher pressure is controlled by a back pressure regulator 98 and flow indicator or meter 100. The solid phase is withdrawn as a slurry and passed through line 82 to the bottom of the WM 46a.

The liquid level in the WM 46a is controlled by branching line 72 to provide lines 72a and 72b, which respectively include control valves 102 and 104. The control valve 104 in branch line 72b is set to maintain a liquid flow equal to the flow of liquid in the slurry in line 82. To that end, flow indicators 106 and 108 are provided for operation of valve 104. The flow in branch line 72b thus prevents fluctuations in the relatively large flow of the slurry in line 82 from grossly disturbing the liquid level in the WM 46a.

The flow in branch line 72a is intended to match that of the backwash liquid. Accordingly, a liquid level indicator 110 is provided to sense the level of accumulated liquid in the WM 46a. The liquid level indicator operates the valve 102. The flows through branch lines 72a and 72b are thereafter joined and returned to the flasher 46b via the continuation of line 72. A back pressure regulator 111 is located in line 72 to maintain the line pressure above the triple point pressure and to prevent flash crystallization.

The liquid level in the WM 46a tends to be self-correcting: as the liquid level increases or rises, the area available for vapor-solid contact decreases, the vapor condensation rate and liquid formation rate decrease, and the melter liquid inventory decreases. Conversely, as the liquid level decreases or goes down, the vapor-solid contact area increases, melting and condensation rates increase, and the melter liquid inventory increases.

The drained bed height which corresponds with the extent of the projection of the solid phase above the liquid level in the WM 46a is controlled by maintaining a constant pressure in the melt zone 90 above the drained bed at the top of WM 46a. To that end, a pressure regulator 112 is provided in line 56. The control objective is not to maintain a precise level of solids in the WM 46a, but merely to prevent the solid phase of the drained bed from reaching the top of the vessel.

The flow of backwash liquid through the packed bed is controlled by maintaining the flows in lines 56 and 54 in a predetermined ratio. The flow of crystallizable material-enriched liquid withdrawn from the WM 46a via line 54 ideally corresponds with the flow of condensing vapor in line 56, with allowance for the flow of backwash liquid. Accordingly, a control valve 114 in line 54 regulates the flow of liquid in accordance with flow indicators 116 and 118.

In an alternative control arrangement, the flow of product withdrawn via line 54 is maximized by monitoring the concentration level of the excluded material in the backwash liquid at an intermediate point in the WM 46a. Only enough downward flow of backwash liquid is used to prevent the upward axial dispersion of hydrogen sulfide and other contaminants beyond this monitored point in the packed bed. Concentration indicator 119 controls the flow of backwash liquid through valve 114 in accordance with the monitored excluded material concentration. In this preferred control strategy, the flow indicators 116 and 118 would be omitted.

Figure 4:
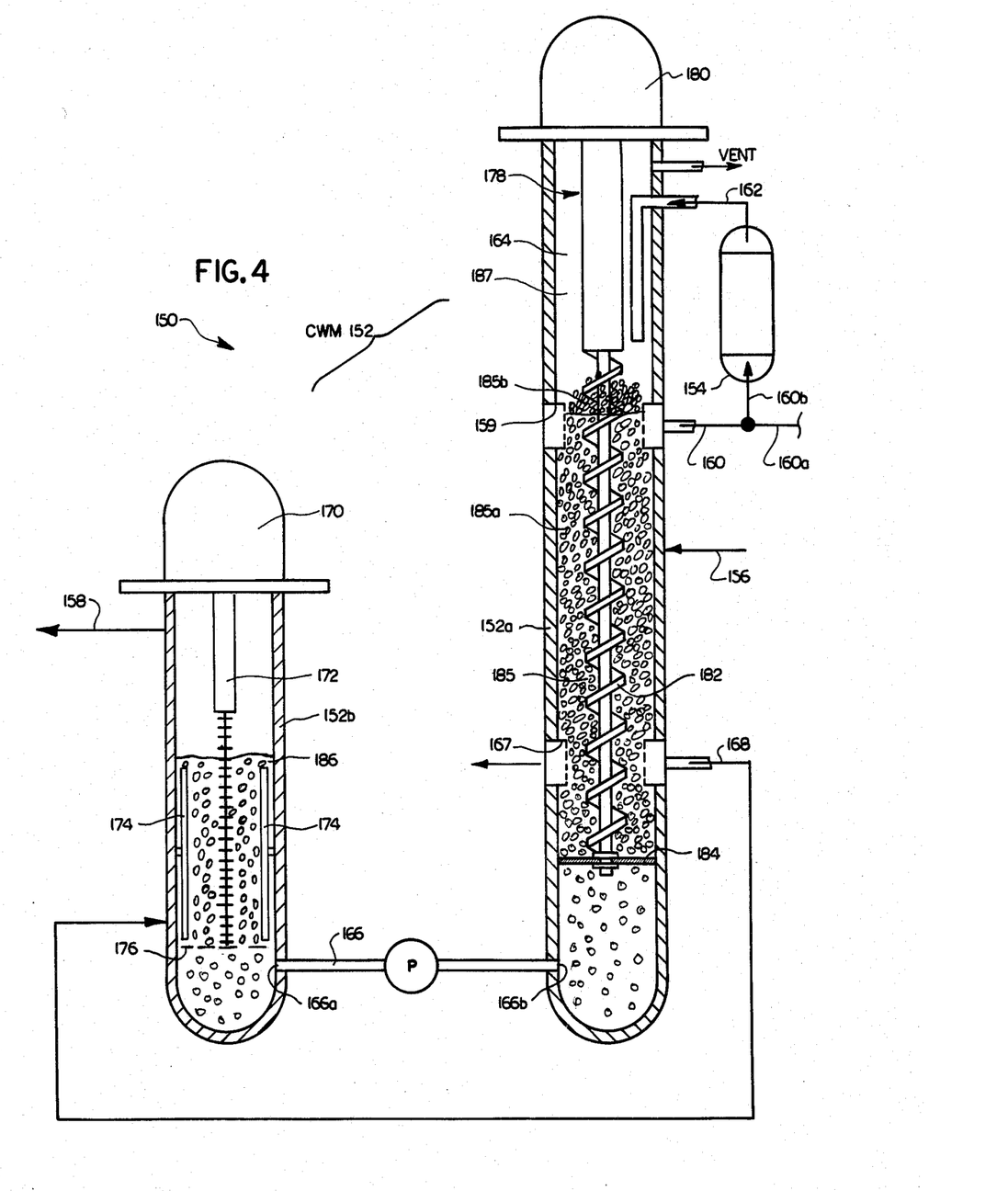
FIG. 4 is a diagrammatic illustration in vertical section of an apparatus used in a single-stage separation process in accordance with the invention.

Referring to FIG. 4, a single-stage crystallizer 150 comprising a CWM 152 and a heat exchanger 154 is shown. Single-stage processing may be acceptable in some applications. For example, in the case of a liquid carbon dioxide feed containing about 1% by weight hydrogen sulfide, and where a purity of only 0.01% to 0.1% hydrogen sulfide is needed, a single stage will be sufficient to produce this purity. The overhead product obtained in this case will contain about 2% to 3% hydrogen sulfide.

The operation of the CWM 152 is similar to that discussed above and, accordingly, the specific features which are illustrated and/or discussed herein may be incorporated in each of the foregoing CWM's unless otherwise noted.

The CWM 152 includes a WM 152a and a flasher 152b. The feed is introduced into the WM 152a through line 156. An excluded material-enriched overhead product is withdrawn from the flasher through line 158. The crystallizable material-enriched product is withdrawn from the WM 152a through a screen collar 159, line 160 and branch line 160a. A portion of this stream is recycled via branch line 160b to heat exchanger 154 to provide a condensing vapor introduced via line 162 into the melt zone 164 of the WM 152a.

The slurry phase produced in the flasher 152b is pumped via slurry pump suction line 166 to the bottom of the WM 152a. The excluded material-enriched liquid formed in the WM 152a is withdrawn through a screen collar 167 and passed through line 168 to the flasher 152b.

The tendency for oversized deposits of solid phase materials, which interfere with slurry pumping, to form and grow on interior surfaces of the flasher 152b is reduced by a number of structural features shown in FIG. 4. Vigorous agitation of the evaporating liquid tends to inhibit formation of such solid deposits and an upper mounted motor 170 is arranged to magnetically drive a central agitator 172. Periodic reverse operation of the agitator is also employed to promote dislodgement of any solid deposits.

Uniform agitation of the flasher 152b is assisted by four stationary baffles 174 (only two being shown) which are spaced 90 degrees apart and mounted close to the interior cylindrical shaped wall of the flasher vessel. The baffles, as well as other interior surfaces of the flasher 152b, may be coated with high lubricity, non-stick materials such as Teflon.

A sizing screen 176 is located adjacent the bottom of the flasher vessel for purposes of limiting the size of the solid phase materials which can reach the slurry pump in line 166. It is believed that oversized solid materials tend to block the slurry pump suction line 166. The screen 176 may be electrically heated in order to reduce the tendency to clog. Similarly, the baffles 174 may also be electrically heated to prevent surface accumulations of solid phase deposits.

The solid phase formed in the flasher 152b is pumped as a slurry through line 166 to the WM 152a. The tendency of the liquid phase to flash within the lower region of the flasher vessel adjacent an inlet 166a of line 166 and/or within the line 166 itself may be minimized by maintenance of a sufficient static liquid head in the flasher vessel above the inlet 166a.

The slurry is delivered to a lower region of the WM 152a through an outlet port 166b of the line 166. Satisfactory pumping has been achieved of slurries having the solid phase present in an amount in the range of from about 10% to about 15% by weight, and in some cases, as high as 25% by weight. Slurry flow occurs in the lower region of the WM 152a and the solid phase is delivered to a mechanical lift 178.

The mechanical lift 178 is provided to assure the continued upward movement of the solid phase. The mechanical lift includes a motor 180, a downwardly extending helical screw member 182, and a lower bearing mount 184.

An upwardly moving packed bed 185 of solid phase forms adjacent the bottom of the mechanical lift 178 and rotation of the screw member 182 continues the upward movement of the packed bed. The lower portion of the packed bed 185 is below the level of the accumulated liquid in the WM 152a to provide a submerged packed bed portion 185a and the upper portion of the packed bed extends from the level of the accumulated liquid to provide a drained bed portion 185b.

The screw member 182 may extend through the entire submerged packed bed and drained bed portions as shown in the illustrated embodiment. Alternatively, the screw member may extend through the submerged packed bed 185a. Further, the mechanical lift member 178 may be located adjacent the bottom of WM 152a and the screw member 182 may extend only into a lower axial extent of the submerged packed bed 185a.

It is not necessary that a mechanical lift be used. The packed bed formation and upward movement may be provided by the fluid friction pressure drop of the liquid phase of the slurry introduced under pressure into the bottom of the WM 152a. In accordance with the preferred techniques, the upward movement of the solid phase and provision of the packed bed are achieved by variation or oscillation of the accumulated liquid level within the WM in order to provide intermittent advance of the bed and solid phase in a ratchetlike movement. This technique is based upon the observed greater ease of formation and movement of the submerged packed bed 185a as compared with the more difficult lifting of the drained bed 185b into vapor space 164. Accordingly, the packed bed advances as the level of liquid increases from its steady state operation position adjacent the collar 159. Thereafter, the liquid level is lowered to its steady state condition and the packed bed does not correspondingly retreat.

For purposes of providing such packed bed movement and liquid level fluctuation, the flow through branch line 72b may be varied by intermittent operation of the control valve 104, as shown in FIG. 3. Using this technique, about one inch of liquid level height variation will occur and ratchet movement of the solid phase is provided. Of course, the flows through both branch lines 72a and 72b may be simultaneously varied by operation of the valves 102 and 104 in order to provide about three to four inches of variation of the liquid level. A similar effect is achieved by variation of the output of the pump in the line 72.

In the CWM 152a of FIG. 4, the liquid phase of the slurry delivers the solid phase to the mechanical lift 178 and cooperates in both the formation and upward movement of the packed bed 185. The liquid level in the WM 152a may be intermittently varied to also facilitate the upward movement of the packed bed, but such is usually not required with the use of a mechanical lift.

The submerged packed bed 185a has a substantially uniform bulky density throughout its vertical extent from the collar 167 to the collar 159 adjacent the drained bed 185b. The submerged packed bed in the illustrated embodiment is estimated to be 30% liquid and 70% solid by weight. The carbon dioxide crystals of the solid phase range from 1 to 2 mm in size.

The drained bed 185b is believed to have a void fraction approaching one-third based on model calculations. The rapid drainage of melt liquid from the drained bed without accumulation therein is consistent with such void fraction. Similarly, heat transfer indicates the drained bed to be nearly devoid of liquid. The major resistance to heat transfer in the bed is believed to be a thin film of melt liquid adhering to the solid phase crystals. In the case of carbon dioxide, this film is estimated to have a thickness of $10^{-2}$ mm.

At start-up, the commencement of the melting of the solid phase is facilitated by purging the melt zone 164 with several volumes of melt gas which is vented. This purge is intended to remove trace contamination with high freezing point components and any accumulation of inert gas which may tend to interfere with melting.

A major portion equal to about 90% of the melt liquid produced is withdrawn through line 160. The remaining portion of the melt liquid provides the backwash liquid within which the packed bed 185a is submerged. The flow of the backwash liquid is sufficient to prevent the upward axial dispersion of the excluded material substantially beyond the level of the screen collar 167.

In accordance with the subject process, the solid phase is continuously submerged in either the liquid phase of the slurry or the contiguously disposed backwash liquid until the formation of the drained bed. This facilitates the handling and movement of the solid phase and enables the use of a simplified washer-melter vessel which essentially provides a single continuous chamber. Thus, WM 152a defines a continuous chamber 187. The liquid phase moves in a co-current direction with the packed bed in a lower region of the chamber located below the collar 167, and the backwash liquid moves in a countercurrent direction relative to the packed bed 185 in an adjacent intermediate region of the chamber located between the collars 167 and 159, and the drained bed is formed in an upper region of the chamber located above the collar 159.

The inventory of liquid within the chamber 187 of the WM 152a is continuous, since the downward flow of backwash liquid combines and mixes directly with the upward flow of the liquid phase of the slurry at a liquid interface adjacent the collar 167. The concentration of excluded material increases in a downward direction through the inventory of liquid within the vessel to a level slightly below the liquid interface where the prevailing concentration of the excluded material in the slurry is reached. The concentration of excluded material in the liquid phase of the slurry remote from the liquid interface is essentially constant and is the maximum concentration of excluded material in the inventory of liquid in the washer-melter vessel.

The concentration of excluded material increases at a moderate rate in a downward direction through the backwash liquid. Slightly above the liquid interface, significant increases in concentration occur at a concentration front established by the upward extent of the axial dispersion of the excluded material including the effects of the mixing at the liquid interface. The position of the concentration front varies in accordance with the amount of backwash liquid flow if other operating conditions remain constant.

The concentration variation in the portion of the liquid phase of the slurry slightly below the liquid interface is due to the dilution of the slurry by the backwash liquid and the upward axial dispersion of the excluded material. The upward axial dispersion is caused by the diffusion of the excluded material in an upward direction opposite to the direction of backwash liquid flow and the upward transport of excluded material adhering to the surface of the solid phase of the rising packed bed. As noted above, the concentration of the excluded material is essentially constant in the portion of the slurry remote from the liquid interface.

Certain of the structural and procedural techniques for limiting the tendency for solid deposits to adhere to the interior surface of the flasher vessels have already been discussed. It is also known to use additives to prevent the formation of such deposits. Useful additives include di-n-ethyl ether, di-n-propyl ether, di-n-butyl ether, t-butyl methyl ether, methyl ethyl ketone, 2-pentanone, t-butyl methyl ketone, methyl isobutyl ketone, methanol, heptane, hexane, butanal, pentanal, 2-methyl butanal, and fluorosulfonic acid. The additives act as impurities and aid the melting of any crystal forming on the walls adjacent crystal forming zones in the flashers. The additives do not evaporate since their vapor pressures are much lower than that of the crystallizable material and other components in the liquid phase, and they remain liquid. Typically, less than 5 mol % additive in the liquid phase is effective.

The packed bed of the present process does not interfere with the use of such additives. Accordingly, the additives remain in the liquid phase and tend to accumulate in the flasher adjacent an upper region of the liquid level therein. In FIG. 4, a region of concentrated additive 186 is diagrammatically illustrated in flasher 152b. Referring to FIG. 2, the additive moves upwardly in staged processes and a region of concentrated additive 188 is diagrammatically shown in flasher 42b. The additive is recycled by withdrawing a liquid stream through line 190 from the region 188.

The withdrawn stream comprising additive, hydrogen sulfide, and carbon dioxide may be separated by distillation, flashing or other means. A distillation system 192 is used in the illustrated embodiment. The hydrogen sulfide and carbon dioxide components are separated as a top product and withdrawn through line 194, and added to the overhead product line being withdrawn from the crystallizer 40. The additive is withdrawn as a bottom product from the distillation system 194 through the line 196 and returned to the lowermost flasher 48b.

In addition to separating carbon dioxide and concentrating hydrogen sulfide in the acid gas separation process, as illustrated above, the crystallization process is also applicable to other systems. Pertinent separation systems may be generally characterized by consideration of the relative volatility ratio, "$\alpha$", of the system. The relative volatility $\alpha$ is the ratio of the gas-liquid solubilities or vapor liquid equilibria constants, K, of the materials (for example, materials 1 and 2) to be separated as represented by the formula:

$$\alpha = K_1/K_2$$

where, $K = y/x$ for each of the materials, y is the mole fraction of the material in the vapor phase and x is the mole fraction of the material in the liquid phase, with equilibrium between the vapor and liquid phases. The K constants are functions of the overall composition of the system and either the pressure or temperature and, therefore, the relative volatility ratio of the system will differ at various locations throughout the crystallization separation process in accordance with the prevailing overall composition of the system, pressure and temperature at a particular location in the process. In the following discussion of crystallization systems and illustrative examples thereof, the relative volatility is considered in terms of the ratio of the K value of the excluded material divided by the K value of the crystallizable material.

The relative volatility ratios for a number of crystallization systems are reported in the table immediately below. In those cases where a single ratio is reported, the reported ratio is the relative volatility of the system at the crystallizable material output end of the process. In those cases where the relative volatility is expressed as a range, the first reported value is the ratio at the crystallizable material output end of the process and the second value is the ratio at the excluded material output end of the process. The ratio, as reported at either end of the process, is based upon a concentrated system wherein either the crystallizable material or the excluded material is present at a concentration in the range of 80% to 90%. In all cases, the ratios are reported at a pressure of about 6.7 atmospheres and a temperature of about $-50°$ C. unless otherwise indicated.

| System | Relative Volatility Ratio ($\alpha$) |
|---|---|
| $H_2S/CO_2$ | 0.72 |
| $C_2H_6/CO_2$ | $2.78 \geq \alpha \geq 0.27$ |
| $C_2H_4/CO_2$* | $1.63 \geq \alpha \geq 0.83$ |
| $C_3H_8/CO_2$** | ~0.1 |
| $COS/CO_2$ | 0.34 |
| $O_2/CO_2$ | >50 |
| $H_2/CO_2$ | >500 |
| $NaCl/CO_2$ | 0 |

*Determined at about 0° C.
**Determined at about $-40°$ C.

The data in the foregoing table illustrates the broad applicability of the crystallization process for effecting the separation of the components of various systems. The relative volatility ratio is conveniently used to identify those systems wherein distillation is not practical or possible.

As noted above in connection with prior art desalination, the novel process herein may be used to separate an excluded material having an appreciable vapor pressure which results in the excluded material being present in the evaporation vapor. Thus, the novel process is further distinguished over prior art desalination by applicability to systems having a relative volatility ratio greater than zero, or at least about 0.1, as contrasted with prior art desalination wherein the ratio is equal to zero.

The subject process is also applicable to systems which are not readily separated by distillation techniques in an economically practical manner. Thus, the crystallization process is useful in systems which during the course of the separation have a relative volatility ratio in the range of $0.3 \leq \alpha \leq 3.0$, the usefulness of distillation in such systems being highly questionable, and the subject process is especially advantageous in systems wherein $0.5 \leq \alpha \leq 2.0$, distillation generally being deemed unsuitable to effect separation of such systems.

In illustration of particular systems, the crystallization process may also be used to separate a liquid carbon dioxide absorbent from one or more absorbed noble gases such as xenon and krypton following the absorption of such noble gases by the liquid carbon dioxide absorbent. The absorbtion of noble gases by carbon dioxide is disclosed in U.S. Pat. Nos. 3,850,593, dated Nov. 26, 1974, and 3,742,720, dated July 3, 1973. The carbon dioxide absorbent and absorbed noble gases may then be processed in the crystallizer 40 for separation of the carbon dioxide and concentration of the noble gases.

In an ethane and carbon dioxide system, ethane is the impurity or excluded material in the crystallization process, and carbon dioxide is again separated as a crystallizable material and functions as the in situ heat transfer component.

A further system to which this process may be applied includes purification of sulfur hexafluoride in a system contaminated with hydrogen sulfide or hydrocarbons. In such a system, sulfur hexafluoride is analogous to the carbon dioxide in the illustrated crystallization process, since it is simultaneously separated as the crystallizable material and serves as an in situ heat transfer component.

The crystallization process is also well suited to the separation of para xylene from meta xylene and ortho xylene. Para xylene has a freezing point of 13.3° C., meta xylene is −47.9° C., and ortho xylene is −25.2° C. The crystallizable material in this separation is para xylene, and the impurities or excluded materials are metal xylene and ortho xylene, which are substantially rejected from the crystal phase. Thus conventional crystallization using heat exchange surfaces is feasible and is practiced. However, the mixed xylene isomers by themselves cannot be conveniently separated in the subject crystallization process, since the vapor pressure of the mixture is too low to provide a reasonably dense vapor phase. Accordingly, it is necessary to include in the system an in situ heat transfer component such as carbon dioxide, sulfur hexafluoride, or a low molecular weight hydrocarbon for purposes of increasing the vapor pressure and the vapor phase density.

Although the preferred embodiment of this invention has been shown and described, it should be understood that various modifications and rearrangements may be resorted to without departing from the scope of the invention as disclosed and claimed herein.

What is claimed is:

1. A triple point crystallization process for separating a crystallizable material from at least one other material which is at least partially excluded from a solid phase obtained upon freezing said materials, comprising promoting the melting of solid phase by the substantial elimination of liquid phase resistance to heat transfer by performing the steps of:
    (a) freezing a liquid mixture of said materials to provide a slurry comprising a solid phase distributed within a liquid phase, said solid phase being more dense than said liquid phase and tending to settle downwardly through said liquid phase due to gravity;
    (b) relatively moving said solid phase in an upward direction through said liquid phase of said slurry to provide a drained bed of solid phase which is substantially free of liquid;
    (c) transferring heat substantially free of liquid phase resistance to said solid phase by contacting the solid phase in said drained bed with a condensing vapor to melt said solid phase and provide a crystallizable material-enriched liquid;
    (d) withdrawing at least a portion of said crystallizable material-enriched liquid as a crystallizable material-enriched output;
    (e) passing the remaining portion of said crystallizable material-enriched liquid in countercurrent flow to said solid phase as a backwash liquid to wash excluded material from the surface of the solid phase and to prevent the upward axial dispersion of excluded material; and
    (f) withdrawing said liquid phase separated from said solid phase in step (b) and said backwash liquid together with excluded material washed from said solid phase as an excluded material-enriched output.

2. A process as set forth in claim 1, including an in situ heat transfer component which provides said condensing vapor.

3. A process as set forth in claim 1, wherein said materials have a relative volatility ratio greater than zero.

4. A process as set forth in claim 3, wherein said crystallizable material is carbon dioxide and said excluded material is sulfur-containing molecules.

5. A process as set forth in claim 2, wherein said in situ heat transfer component comprises carbon dioxide, said crystallizable material is para xylene, and said excluded material is meta xylene or otho xylene, or both.

6. A process as set forth in claim 3, wherein said crystallizable material is sulphur hexafluoride and said excluded material is hydrogen sulfide, or hydrocarbons which depress the freezing point of sulfur hexafluoride, or both.

7. A process as set forth in claim 3, wherein said crystallizable material is carbon dioxide and said excluded material is ethane.

8. A process as set forth in claim 2, wherein said condensing vapor penetrates said drained bed for contact with bed interior surface area provided by said solid phase and the rate of melting is proportional to the vapor-solid contact area.

9. A process as set forth in claim 3, wherein a mechanical lift means is provided to move said solid phase in step (b).

10. A process as set forth in claim 1, wherein step (c) includes melting said solid phase by direct contact with a condensing vapor of an in situ heat transfer component.

11. A process as set forth in claim 10, wherein said materials have a relative volatility ratio greater than zero.

12. A process as set forth in claim 2, including providing a washer-melter vessel having an inventory of liquid therein provided by said liquid phase of said slurry in a lower region of said vessel and said backwash liquid in a contiguous upper region of said vessel, said inventory of liquid being maintained at a predetermined level in said washer-melter vessel, and wherein step (a) includes feeding said slurry into said lower region of said washer-melter vessel and step (b) includes moving said solid phase inwardly through said liquid phase and said backwash liquid to locate said drained bed in a melt zone provided in a vapor space in said vessel, said solid phase being continuously and sequentially submerged in said liquid phase and then said backwash liquid prior to providing said drained bed of solid phase.

13. A process as set forth in claim 12, wherein said condensing vapor penetrates said drained bed for contact with bed interior surface area provided by said solid phase in said melt zone and the rate of melting is proportional to the amount of solid phase in the melt zone.

14. A process as set forth in claim 12, wherein step (f) includes controlling the withdrawal of a first flow of said excluded material-enriched output in accordance with a ratio of the flow of said liquid phase of said slurry into said washer-melter and controlling the withdrawal of a second flow of said excluded material-enriched output in accordance with the level of the liquid inventory in said washer-melter vessel.

15. A process as set forth in claim 14, wherein a controlled flow of said condensing vapor is introduced into said melt zone to maintain a constant pressure in said vapor space.

16. A process as set forth in claim 15, wherein step (e) includes controlling the withdrawal of said crystallizable material-enriched output in accordance with a ratio of the flow of said condensing vapor into said vapor space in said melt zone.

17. A process as set forth in claim 12, wherein said liquid phase of said slurry moves upwardly in said lower region of said washer-melter vessel and said solid phase is moved upwardly through said lower region and into said melt zone by the buoyancy of said liquid phase as it moves in said lower region.

18. A process as set forth in claim 17, wherein the flow of said liquid phase is varied to provide stepwise advance of said solid phase in said upward direction.

19. A process as set forth in claim 18, wherein a mechanical lift means is provided to cooperate with said liquid phase to move said solid phase in said upward direction.

20. A process as set forth in claim 12, wherein steps (d) and (e) include monitoring the concentration of excluded material in said backwash liquid at a location below said predetermined level of said inventory of liquid in said washer-melted vessel and, in accordance with the monitored concentration of excluded material, withdrawing said crystallizable material-enriched output in an amount such that the flow of said backwash liquid is just sufficient to prevent upward axial dispersion of said excluded material in said backwash liquid.

21. A process as set forth in claim 12, wherein a mechanical lift means is provided to move said solid phase in said upward direction and into said melt zone.

22. A process as set forth in claim 12, wherein a flasher vessel containing said liquid mixture of said materials to be frozen is provided and including the further steps of withdrawing an evaporation vapor from said flasher vessel to freeze said liquid mixture therein and to provide said slurry, and passing said slurry from said flasher vessel to said lower region of said washer-melter vessel, said flasher and washer-melter vessels providing a first separation stage and being connected in series to a second separation stage including second flasher and washer-melter vessels, a second stage evaporation vapor being passed to said first stage washer-melter vessel to provide said first stage condensing vapor, and said first stage crystallizable material-enriched output being passed to said second stage to augment the liquid phase of said materials contained within said second flasher vessel.

23. A process as set forth in claim 22, wherein said second stage solid phase is melted by indirect heat transfer.

24. A process as set forth in claim 22, including the step of passing a second stage excluded material-enriched output to said first stage washer-melter vessel to augment the inventory of liquid contained therein.

25. A triple point crystallization process for separating a crystallizable material from at least one other material which is at least partially excluded from a solid phase obtained upon freezing said materials, comprising promoting the melting of the solid phase by the substantial elimination of the liquid phase resistance to heat transfer by performing the steps of:
  (a) freezing a liquid mixture of said materials to provide a slurry of a solid phase distributed in a liquid phase, said solid phase being more dense than said liquid phase and tending to settle therein by gravity, and introducing said slurry into a lower region of a washer-melter vessel;
  (b) moving said solid phase in an upward direction in said washer-melter vessel to provide a drained bed of said solid phase within a melt zone comprising a vapor space in said washer-melter vessel;
  (c) melting said solid phase in said drained bed by direct contact with a condensing vapor of an in situ heat transfer component to provide a crystallizable material-enriched liquid;
  (d) withdrawing at least a portion of said crystallizable material-enriched liquid as a crystallizable material-enriched output of said washer-melter vessel;
  (e) passing the remaining portion of said crystallizable material-enriched liquid downwardly through said washer-melter vessel as a backwash liquid to wash excluded material from the surface of the upwardly moving solid phase and to prevent upward axial dispersion of excluded material; and
  (f) withdrawing said liquid phase separated from said solid phase and said backwash liquid together with excluded material washed from said solid phase as an excluded material-enriched output of said washer-melter vessel.

26. A process as set forth in claim 25, wherein an inventory of liquid is maintained at a predetermined level in said washer-melter vessel and step (b) includes forming a packed bed of said solid phase having an upper end portion which provides said drained bed and moving said packed bed upwardly to project said upper end portion of said packed bed beyond the level of the inventory of liquid and into said melt zone to provide said drained bed.

27. A process as set forth in claim 26, wherein the level of liquid in said washer-melter vessel is intermittently varied to provide the upward movement of said packed bed.

28. A process as set forth in claim 25, wherein the upward movement of said packed bed is provided at least in part by a mechanical lift means arranged to move said solid phase in an upward direction.

29. A process as set forth in claim 26, wherein said in situ heat transfer component comprises a vapor phase of said crystallizable material and a lesser proportion of said excluded material.

30. A process as set forth in claim 29, wherein said crystallizable material is carbon dioxide and said excluded material is hydrogen sulfide and other sulfur-containing molecules.

31. A process as set forth in claim 26, wherein said heat transfer component is a vapor phase of said materials and said materials have a volatility ratio greater than zero.

32. A process as set forth in claim 26, wherein step (e) includes submerging an adjacent portion of said packed bed below said drained bed in said backwash liquid to provide a submerged packed bed.

33. A process as set forth in claim 32, wherein said liquid phase of said slurry delivers said solid phase to a lower end portion of said packed bed and the upward movement of said packed bed is provided at least in part by the fluid friction pressure drop of said liquid phase.

34. A process as set forth in claim 33, wherein the upward movement of said packed bed is provided solely by said liquid phase.

35. A process as set forth in claim 30, wherein said slurry is formed in a flasher vessel containing said liquid mixture of said materials and an additive is added to said slurry to prevent solid deposits from accumulating on the interior surfaces of said flasher vessel, said additive being selected from the group consisting of di-n-ethyl ether, di-n-propyl ether, di-n-butyl ether, t-butyl methyl ether, methyl ethyl ketone, 2-pentanone, t-butyl methyl ketone, methyl isobutyl ketone, methanol, heptane, hexane, butanal, pentanal, 2-methyl butanal, and fluorosulfonic acid.

36. A process as set forth in claim 30, wherein step (c) is performed at a pressure in the range of from about the triple point pressure prevailing in said melt zone to a pressure about 30 psia higher than the triple point pressure prevailing in the melt zone.

37. A process as set forth in claim 30, wherein step (c) is performed at a pressure in the range from the triple point pressure prevailing in said melt zone to a pressure about 3 psia higher than the triple point pressure prevailing in the melt zone.

38. A triple point crystallization process for separating a crystallizable material from at least one other material which is at least partially excluded from a solid phase obtained upon freezing a liquid phase of said materials, comprising promoting the melting of the solid phase by the substantial elimination of the liquid phase resistance to heat transfer by performing the steps of:

(a) freezing a liquid mixture of said materials to provide a slurry of a solid phase distributed in a liquid phase, said solid phase being more dense than said liquid phase and tending to settle therein by gravity, said materials having a relative volatility ratio greater than zero, and introducing said slurry into a lower region of a washer-melter vessel wherein an inventory of liquid is maintained at a predetermined level and a melt zone is provided in a vapor space above the inventory of liquid;

(b) moving said solid phase in an upward direction in said washer-melter vessel to form a packed bed of said solid phase below said predetermined level of the inventory of liquid, and projecting an upper end portion of said packed bed beyond said predetermined level of said inventory of liquid to provide a drained bed of said solid phase in said melt zone;

(c) melting said solid phase in said drained bed by direct contact with a condensing vapor of an in situ heat transfer component to provide a crystallizable material-enriched liquid, said condensing vapor penetrating said drained bed to provide vapor-solid contact with the interior surface of said bed provided by said solid phase;

(d) withdrawing at least a portion of said crystallizable material-enriched liquid as a crystallizable material-enriched output of said washer-melter vessel;

(e) passing the remaining portion of said crystallizable material-enriched liquid downwardly through said washer-melter vessel as a backwash liquid to wash excluded material from the surface of the upwardly moving solid phase and to prevent the upward axial dispersion of excluded material; and (f) withdrawing said liquid phase separated from said solid phase and said backwash liquid together with excluded material washed from said solid phase as an excluded material-enriched output of said washer-melter vessel.

39. A process as set forth in claim 38, wherein said inventory of liquid consists essentially of said liquid phase of said slurry and said backwash liquid together with excluded material washed from said solid phase.

40. A process as set forth in claim 39, wherein said washer-melter vessel provides a single continuous chamber, and said liquid phase moves in a co-current direction with said packed bed in a lower region of said chamber, said backwash liquid moves in a countercurrent direction relative to said packed bed in an adjacent intermediate region of said chamber, and said melt zone is provided in an upper region of said chamber above said predetermined level of the inventory liquid.

41. A process as set forth in claim 40, wherein said relative volatility ratio is in the range of from about 0.3 to about 3.0.

42. A process as set forth in claim 41, wherein a mechanical lift is provided to move said solid phase and packed bed in said upward direction.

43. A process as set forth in claim 39, wherein said inventory of liquid is continuous and said downward flow of backwash liquid combines directly with said upward flow of liquid phase of said slurry at a liquid interface.

44. A process as set forth in claim 43, including providing a downwardly increasing concentration gradient of excluded material in said backwash liquid, monitoring said concentration and, in accordance with the monitored concentration, withdrawing said crystallizable material-enriched output in an amount such that the flow of backwash liquid prevents upward axial dispersion of said excluded material in said backwash liquid.

45. A process as set forth in claim 40, including the step of monitoring the concentration of said excluded material in said intermediate region of said chamber and, in accordance with the monitored concentration of excluded material, withdrawing said crystallizable material-enriched output in an amount such that the flow of said backwash liquid prevents upward axial dispersion of said excluded material in said intermediate region of said chamber.

46. A process as set forth in claim 43, wherein said crystallizable material is carbon dioxide and said excluded material is hydrogen sulfide and other sulfur-containing molecules.

47. A triple point crystallization process for separating a crystallizable material from at least one other material which is at least partially excluded from a solid phase obtained upon freezing a liquid phase of said materials, comprising promoting the melting of the solid phase by the substantial elimination of the liquid phase resistance to heat transfer by performing the steps of:

(a) forming said solid phase by freezing a liquid mixture of said materials to provide a slurry of a solid phase distributed in a liquid phase, said solid phase being more dense than said liquid phase and tending to settle downwardly through said liquid phase due to gravity;

(b) relatively moving said solid phase in an upward direction through said liquid phase to provide a drained bed of solid phase which is substantially free of liquid;

(c) transferring heat substantially free of liquid phase resistance to said solid phase by contacting the solid phase in said drained bed with a condensing vapor of at least one of said materials to melt substantially all of said solid phase and provide a crystallizable material-enriched liquid;

(d) withdrawing at least a portion of said crystallizable material-enriched liquid as a crystallizable material-enriched output;

(e) passing the remaining portion of said crystallizable material-enriched liquid in countercurrent flow to said solid phase as a backwash liquid to wash excluded material from the surface of the solid phase and to prevent upward axial dispersion of excluded material; and (f) withdrawing said liquid phase separated from said solid phase in step (b) and said backwash liquid together with excluded material washed from said solid phase as an excluded material-enriched output.

48. A process as set forth in claim 47, including providing a washer-melter vessel having an inventory of liquid therein provided by said liquid phase of said slurry in a lower region of said vessel and said backwash liquid in a contiguous upper region of said vessel, said inventory of liquid being maintained at a predetermined level in said washer-melter vessel, and wherein step (a) includes introducing said slurry into said lower region of said washer-melter vessel and step (b) includes moving said solid phase upwardly through said liquid phase and said backwash liquid to locate said drained bed in a melt zone provided in a vapor space above said predetermined liquid level in said vessel, said solid phase being continuously and sequentially submerged in said liquid phase and then said backwash liquid prior to providing said drained bed of solid phase.

49. A process as set forth in claim 48, wherein said condensing vapor penetrates said drained bed for contact with bed interior surface area provided by said solid phase in said melt zone and the rate of melting is proportional to the amount of solid phase in the melt zone.

50. In a triple point crystallization process for separating crystallizable material from excluded material wherein said phase is formed and melted in a plurality of series connected stages between which flows of increasing concentration of crystallizable and excluded materials are passed in opposite directions, the improvement comprising promoting the melting of solid phase by the substantial elimination of liquid phase resistance to heat transfer by performing in each of at least two of the stages the steps of:

(a) freezing a mixture of a crystallizable material and an excluded material to form a slurry comprising a solid phase from which the excluded material is at least partially excluded distributed within a liquid phase, said solid phase being more dense than said liquid phase and tending to settle downwardly due to the force of gravity;

(b) relatively moving said solid phase in an upward direction through said liquid phase of said slurry to provide a drained bed of solid phase which is substantially free of liquid;

(c) transferring heat substantially free of liquid phase resistance to said solid phase by contacting the solid phase in said drained bed with a condensing vapor of an in situ heat transfer component to melt said solid phase and provide a crystallizable material-enriched liquid, passing a compressed vapor of said in situ heat transfer component from one of said stages to the other of said stages to provide said condensing vapor therein;

(d) withdrawing at least a portion of said crystallizable material-enriched liquid as a crystallizable material-enriched output;

(e) passing the remaining portion of said crystallizable material-enriched liquid in countercurrent flow to said solid phase as a backwash liquid to wash excluded material from the surface of the solid phase and to prevent the upward axial dispersion of excluded material; and (f) withdrawing said liquid phase separated from said solid phase in step (b) and said backwash liquid together with excluded material washed from said solid phase as an excluded material-enriched output.

* * * * *